United States Patent

Brown et al.

[11] Patent Number: 5,947,691
[45] Date of Patent: Sep. 7, 1999

[54] WINDING SUPPLY CIRCUIT WITH CURRENT AND THERMAL PROTECTIVE ELEMENTS

[75] Inventors: Fred A. Brown, Coronado; Octavio Gorrino, Spring Valley, both of Calif.

[73] Assignee: Comair Rotron, Inc., San Ysidro, Calif.

[21] Appl. No.: 08/960,192

[22] Filed: Oct. 29, 1997

[51] Int. Cl.[6] .................................................. F04B 49/00
[52] U.S. Cl. ........................................................ 417/44.1
[58] Field of Search ............................... 417/44.1; 361/31

[56] References Cited

U.S. PATENT DOCUMENTS

| | | | |
|---|---|---|---|
| 4,656,553 | 4/1987 | Brown | 361/31 |
| 5,524,556 | 6/1996 | Rowlette et al. | 110/162 |
| 5,531,807 | 7/1996 | McCombs | 95/26 |
| 5,600,550 | 2/1997 | Cook | 363/50 |

OTHER PUBLICATIONS

"OMNIFETS–Fully Autoprotected Power MOSFETs," Microelectronics Marketing News, May 1996; Issue 15, pp. 6–7.

"OMNIFETS –Fully Autoprotected Power MOSFETs", Microelectronics marketing News, Issue 15, at pp. 6–7, May 1996.

Primary Examiner—Charles G. Freay
Assistant Examiner—Robert Z. Evora
Attorney, Agent, or Firm—Bromberg & Sunstein LLP

[57] ABSTRACT

A winding circuit for use in a fan includes first and second integrated circuits that each include a transistor for powering first and second fan windings in the fan, and at least one of a thermal shutdown element that switches the winding circuit "off" if the integrated circuit reaches a predetermined temperature, and a current regulating circuit. The fan includes a rotor having a magnet, and a stator having a magnet sensor to alternatively transmit current to the first and second windings, which also are located in the stator. The integrated circuits may be autoprotected MOSFETs and the magnet sensor may be a Hall effect sensor.

24 Claims, 3 Drawing Sheets

WINDING SUPPLY CIRCUIT WITH CURRENT AND THERMAL PROTECTIVE ELEMENTS

FIELD OF THE INVENTION

This invention generally relates to fans and, more particularly, to winding supply circuits for fans.

BACKGROUND OF THE INVENTION

Fans commonly are utilized in many applications such as, for example, for cooling electronic elements within a computer system. One such fan is shown in U.S. Pat. No. 4,656,553 (Brown), the disclosure of which is incorporated herein, in its entirety, by reference. The fan shown in Brown ("Brown fan") has been distributed under the trade name "THERMAPRO-V™", distributed by Comair Rotron, Inc. of San Ysidro, Calif.

The Brown fan includes a rotor having a rotor magnet, and a stator having a pair of windings that magnetically interact with the rotor magnet. During operation, the windings are controlled by a winding supply circuit to rotate the rotor. Among other elements, the supply circuit includes a pair of power transistors that each power one of the two windings, a magnetic sensor for selectively energizing the power transistors, an adjustable voltage regulator for protecting the fan motor and controlling fan performance, and an external programmable element that cooperates with the regulator for externally controlling (i.e., programming) the speed of the fan.

The power transistors, programmable element, and regulator each are voltage drops in the winding circuit that reduce the effective voltage across the windings. Consequently, these three elements utilize a significant amount of the input voltage that is introduced to the circuit at the voltage input In addition to powering the three noted elements, however, the input voltage also energizes the windings. Accordingly, the input voltage must be sufficiently high to effectively energize the windings, in addition to the power transistors, programmable element, and regulator.

The regulator, which is disclosed as a conventional integrated circuit, may be internally adjusted by an adjust terminal to control the voltage at an output terminal of the regulator. This adjusting feature internally sets the speed of the fan so that one fan may be used for different applications. The voltage regulator also includes a thermal shutdown element and current regulator that together prevent the motor windings and the winding supply circuit from overheating due to receipt of too much current. Specifically, the current regulator limits the current to a maximum value and the thermal shutdown element shuts down the circuit for a predetermined time period if the voltage regulator reaches a preselected temperature. A number of discrete elements, such as Zener diodes and resistors, also are required to ensure that the voltage regulator operates as specified. Reference is made to Brown for a more detailed description of the voltage regulator and other features of the winding supply circuit.

SUMMARY OF THE INVENTION

In accordance with one aspect of the invention, a winding circuit for use in a fan includes first and second integrated circuits that each include a transistor for powering first and second fan windings in the fan, and a thermal shutdown element that switches the winding circuit "off" (i.e., preventing current transmission through the circuit) if the integrated circuit reaches a predetermined temperature. The fan includes a rotor having a magnet, and a stator having a magnet sensor to alternatively transmit current to the first and second windings, which also are located in the stator. The integrated circuits also may include a current regulating element that limits current to a predetermined maximum value. The integrated circuits may include metal oxide semiconductor field effect transistors (a/k/a "MOSFETs") and the magnet sensor may be a Hall effect sensor.

In accordance with another aspect of the invention, a winding circuit for use in a fan includes first and second integrated circuits that each include a transistor for powering first and second fan windings in the fan, and a current regulating element that limits current to a predetermined maximum value. The fan includes a rotor having a magnet, and a stator having a magnet sensor to alternatively transmit current to the first and second windings, which also are located in the stator. The integrated circuits also may include a thermal shutdown element that switches the winding circuit off if the integrated circuit reaches a predetermined temperature. The integrated circuits may include MOSFETs and the magnet sensor may be a Hall effect sensor.

Some embodiments of the invention advantageously control the flow of current to the fan windings, consequently dissipating less power than the prior art Brown '553 fan and providing more of the input voltage to the windings. Moreover, embodiments of the fan may be manufactured at lower cost than the Brown '553 fan.

BRIEF DESCRIPTION OF THE DRAWINGS

The foregoing and other objects and advantages of the invention will be appreciated more fully from the following further description thereof with reference to the accompanying drawings wherein.

DESCRIPTION OF THE ILLUSTRATIVE EMBODIMENT

Figure 1:
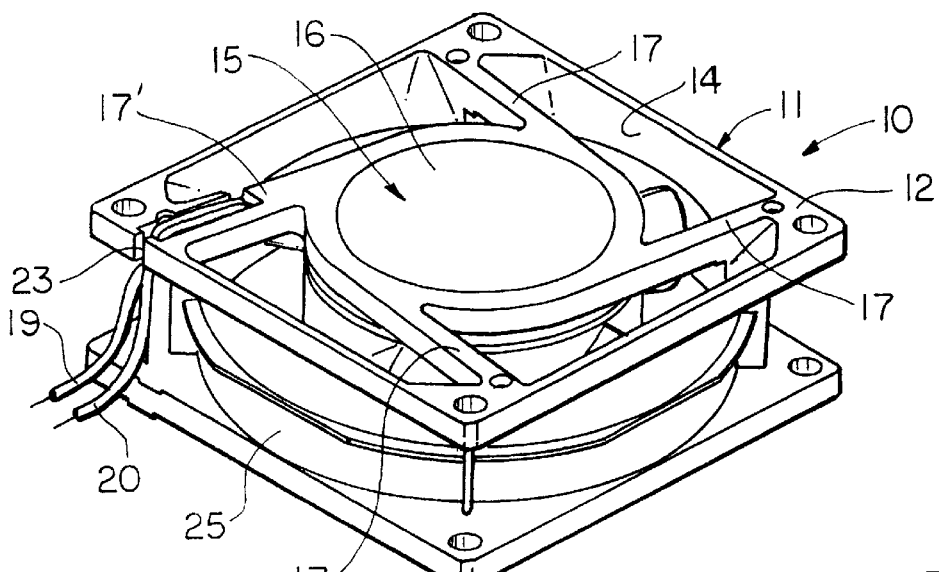
FIG. 1 is a perspective view of a fan that may be utilized with a preferred embodiment of the invention.

FIG. 1 shows a brushless DC fan 10 that may incorporate a preferred embodiment of the inventive winding circuit (discussed in detail below with reference to FIG. 3). The description of the fan 10 is for exemplary purposes only, however, since the inventive winding circuit may be utilized in other types of fans known in the art.

The fan 10 includes a housing 11 with a front surface 12, a rear surface 13, and a venturi 14 extending between the front and rear surfaces 12 and 13. A motor, shown generally at 15, is centrally located in the housing 11. The motor 15 may be any conventional motor used within fans such as, for example, a single-phase or poly-phase motor. The winding circuit (discussed below) and a stator are supported in fixed relation to the housing 11 in a central housing portion 16 that is connected to the venturi 14 by struts 17 of a spider structure. Leads 19 and 20 are brought out from the motor electronics along one strut 17'. Strut 17' is specially formed for this purpose with a longitudinal channel leading to a narrow groove 23 at the outer periphery of the housing 11. The groove 23 retains the leads 19 and 20 in the channel while directing them toward the generally cylindrical exterior 25 of the housing 11 as shown.

Figure 2A:
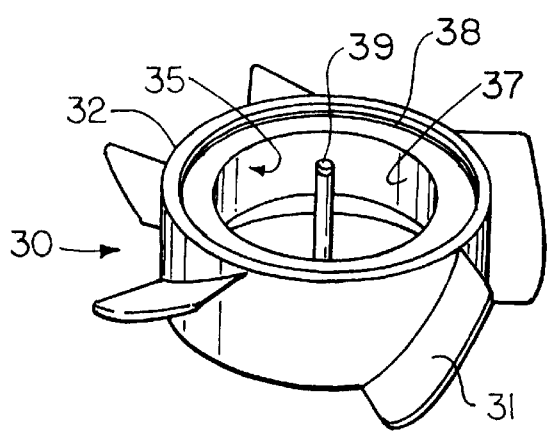
FIG. 2a is a perspective view of the impeller of the fan shown in FIG. 1.
Figure 2B:
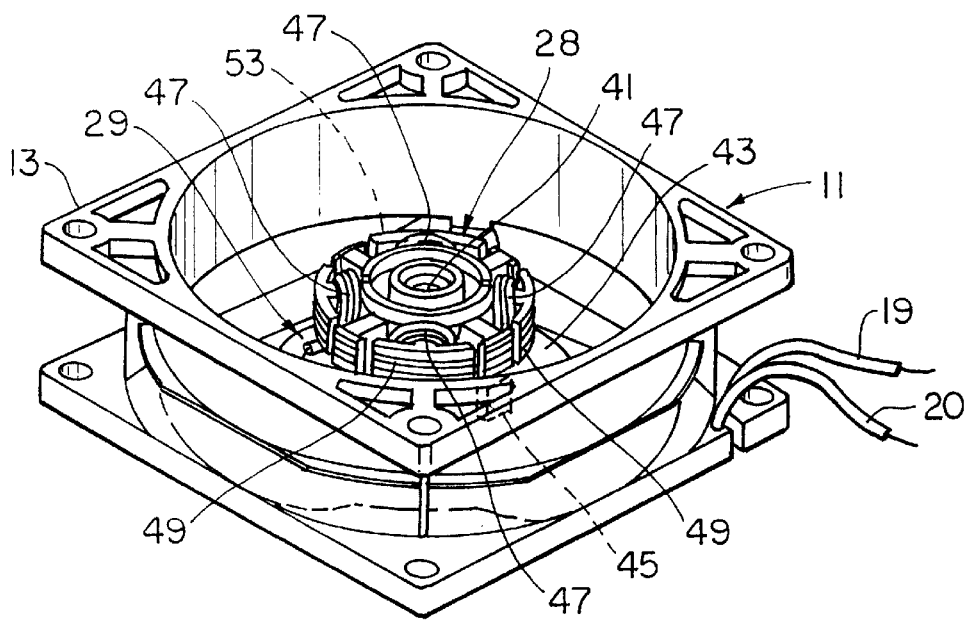
FIG. 2b is a perspective view of the stator, circuit board, venturi, and housing of the fan shown in FIG. 1.

FIGS. 2a and 2b respectively show the rotational and stationary parts of the fan 10 of FIG. 1. FIG. 2b shows the housing 11, a stator 28, and circuitry 29 (including the winding circuit) of the fan 10 inverted from their position in FIG. 1. FIG. 2a illustrates an impeller 30 of the fan 10 as shown in FIG. 1. The impeller 30 includes fan blades 31 supported on a hub 32 (e.g., manufactured from plastic), which in turn is secured to a rotor 35 of the fan motor 15. The rotor 35 has an annular permanent magnet 37 in a steel cup 38. The central shaft 39, which is secured to the end face of the cup 38, is received in bearings 41 in the stator assembly of FIG. 2b when the fan 10 is assembled.

As shown in FIG. 2b, the fan circuitry 29 is mounted on a circular printed circuit board 43. For the purpose of communication, a magnetic sensor 45 (e.g., a conventional Hall effect sensor) is supported on the printed circuit board 43 inside the magnet 37 to sense the changing magnetic field. More particularly, the magnetic sensor 45 is positioned just opposite a communication portion of the magnet 37 and is used to control switching of current to windings 47 on the stator 28 as described, for example, in the applicant's earlier U.S. Pat. No. 4,494,028, the disclosure of which is incorporated herein, in its entirety, by reference. A field magnet portion of the magnet 37 interacts with the poles 49 of the stator 28 to effect rotation of the impeller 30 upon communication of the energizing current to the windings 47 of the stator 28. Leads 19 and 20 supply the electrical power that activates the circuit 29 and energizes the windings 47.

Figure 3:
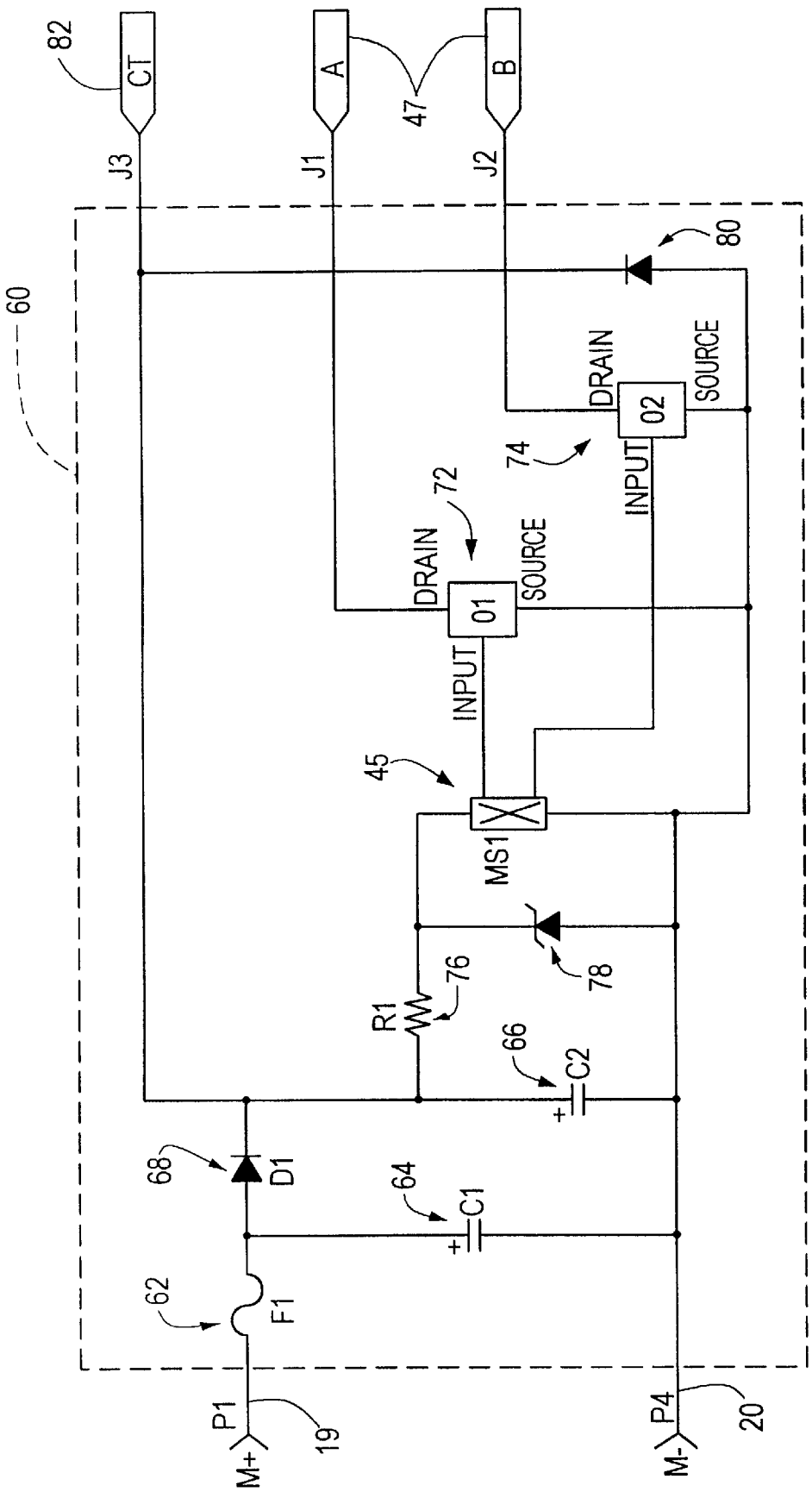
FIG. 3 is a circuit diagram illustrating the preferred internal winding circuit utilized within the fan.

FIG. 3 shows a preferred embodiment of a winding circuit 60 (i.e., a part of the circuitry 29) that may be implemented on the printed circuit board 43 within the fan housing 11. The circuit 60 receives an input voltage across leads 19 and 20. The lead 19 preferably is the high side or positive supply voltage, and the lead 20 preferably is ground. The circuit 60 includes a first portion, which includes a current limiting fuse 62, noise limiting first and second capacitors 64 and 66, and a first diode 68. The first portion limits the effect of transients that may be transmitted through the leads 19 and 20. Moreover, the diode 68 of the first portion provides reverse polarity protection if the intended polarity of the leads 19 and 20 is accidentally reversed. The first portion connects the high input lead 19 to a center tap of fan windings (discussed below).

The winding circuit 60 further includes the magnetic sensor 45, a first powering integrated circuit 72 connected between the magnetic sensor 45 and a first of the windings 47, a second powering integrated circuit 74 connected between the magnetic sensor 45 and a second of the windings 47, and a Zener regulation circuit to regulate input voltage into the magnetic sensor 45. The Zener regulation circuit includes a resistor 76 and a Zener diode 78 to clamp the voltage across the magnetic sensor 45 to a preselected maximum voltage. In the preferred embodiment, a fan operating at about twelve volts has the following element values:

fuse 62: about a seven ampere maximum current limit;
first diode 68: a Schottky diode with about a 0.25 voltage drop;
second diode 80: a "dump" diode with a 200 peak inverse voltage at one ampere (e.g., Motorola diode number 1N4003);
first capacitor 64: about 0.01 microfarads;
second capacitor 66: about twenty-two microfarads;
resistor 76: about 100 ohms; and
Zener diode 78: a reverse breakdown voltage of about twelve volts.

Each of the two powering integrated circuits 72 and 74 preferably comprise autoprotected power metal oxide semiconductor field effect transistors ("autoprotected MOSFETs"), such as those distributed under the trade name OMNIFET™ by SGS-Thompson Microelectronics Incorporated of Carlton, Tex. Reference is made to "Feature II: OMNIFETs-Fully Autoprotected Power MOSFETS", published in SGS-Thompson Microelectronics Marketing News, Issue 15, dated May of 1996, the disclosure of which is incorporated herein by reference. During normal operation, the powering integrated circuits 72 and 74 alternatively power their respective windings 47. Each integrated circuit 72 and 74 includes either or both a thermal shutdown element (see FIG. 4) and a current regulator element (see FIG. 4). In accordance with a preferred embodiment of the invention, each integrated circuit 72 and 74 includes both such elements that together protect the circuit 60 and windings 47 from overheating due to receipt of too much current. Specifically, the thermal shutdown element enables the integrated circuit being utilized to shut down the winding circuit 60 (i.e., turn the circuit 60 "off" to prevent current flow through the circuit 60) if the temperature of such integrated circuit becomes too high. Accordingly, the circuit 60 should turn off for a time period that enables the temperature of the integrated circuit 72 or 74 to cool to a temperature that is below a preselected temperature. In some embodiments, the circuit 60 remains off for about 0.1 seconds, which should enable the integrated circuit 72 or 74 to fall below about 150 degrees Centigrade.

Similarly, the current regulator element of the integrated circuits 72 and 74 ensures that no more than a maximum current (e.g., five to seven amperes) may be drawn from the source through the winding circuit 60. Such maximum currents typically are drawn by the motor during start-up. Accordingly, the current through the circuit 60 is clamped at the predetermined maximum current when large currents are drawn.

The integrated circuits 72 and 74 each have three terminals. Specifically, the integrated circuits 72 and 74 each include a drain terminal connected to the respective winding, a source terminal connected to both the ground lead 20 and a second diode 80 (which is connected to a center tap 82 of the windings 47), and an input terminal for receiving an input signal from the magnetic sensor 45.

Figure 4:
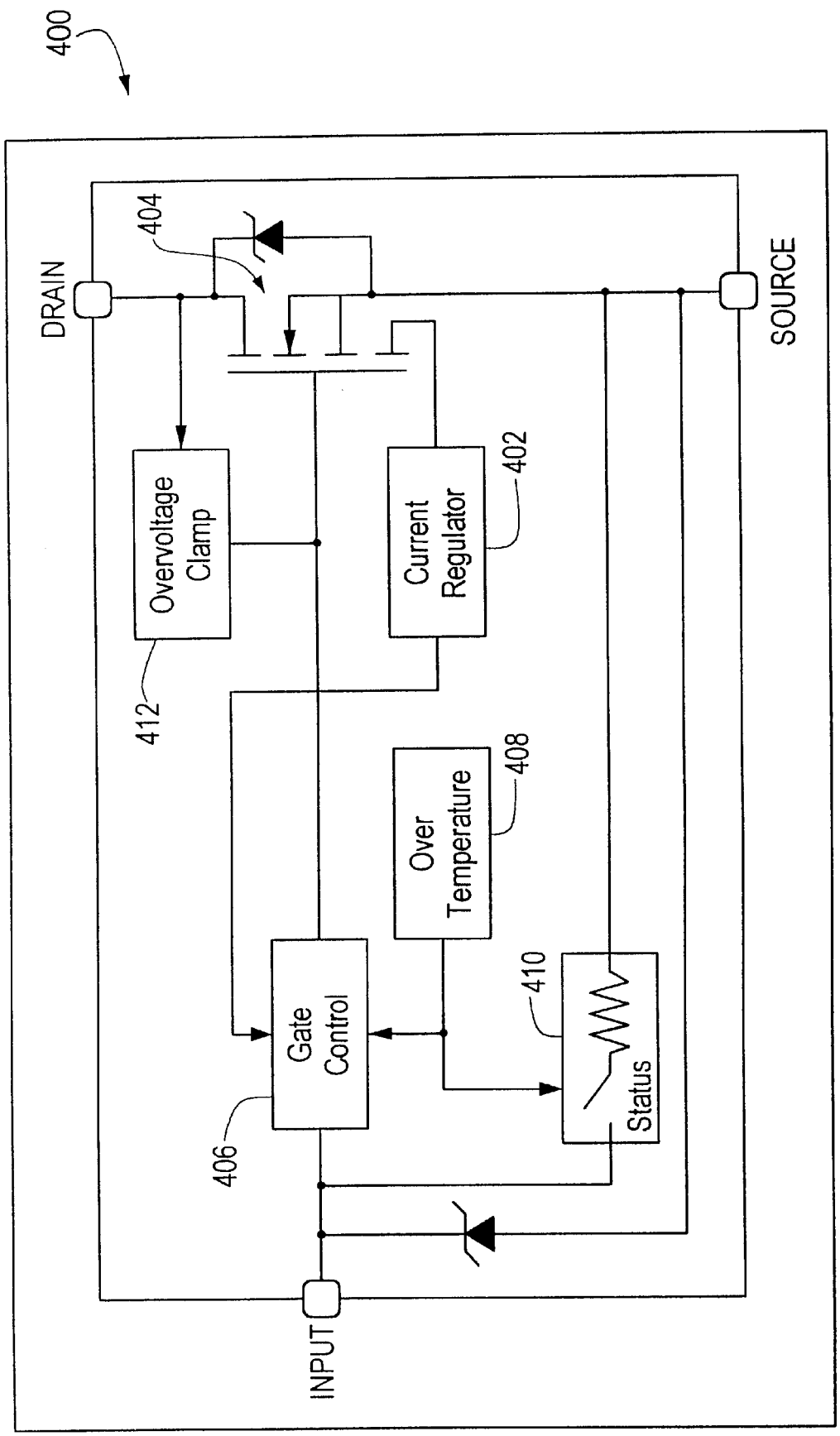
FIG. 4 schematically shows the internal configuration of an autoprotected MOSFET that may be utilized in integrated circuits within the preferred winding circuit.

FIG. 4 schematically shows the internal configuration of an autoprotected MOSFET chip 400 that may be utilized in the integrated circuits 72 and 74 in a preferred embodiment of the invention. The autoprotected MOSFET chip 400 includes a current regulator element 402 to limit current to the predetermined maximum current, a MOSFET 404 to power the windings, and a thermal shutdown element to turn the circuit off if the temperature in the chip 400 becomes too high (as discussed above). The thermal shutdown element includes a gate control element to receive an input power signal that powers the chip 400, a status element 410 that determines if the temperature of the chip 400 is at the predetermined maximum, and an over-temperature element 408 (i.e., thermal shutdown element, noted above) having circuitry to negate the input power signal (i.e., turning the chip 400 off) in response to input from the status element 410. Circuitry in the status element 410 both senses the temperature and controls the over-temperature element 408 to negate the gate control signal if the temperature is at the predetermined maximum. In addition to the above noted elements, the chip 400 also includes an over-voltage clamp 402 for protecting against voltage transients.

In use, the integrated circuits 72 and 74 operate similar to conventional power MOSFETS by alternatively providing a circuit to ground for their respective windings 47. Unlike conventional power MOSFETS, however, the integrated circuits 72 and 74 each continually monitor their respective temperatures and shut off if the temperature reaches the predetermined maximum value. Similarly, the integrated circuits 72 and 74 each provide the current regulation to protect the circuit from overheating due to receipt of too much current.

The circuit 60 preferably does not include externally programmable elements (e.g., the external programmable element in the Brown '553 patent) or voltage adjusting elements (e.g., the adjust terminal in the Brown '553 patent), thus simplifying the design and eliminating the need for additional discrete elements associated with their functions. Accordingly, the ultimate manufacturing cost of the fan is decreased since fewer elements are required. Moreover, the integrated circuits 72 and 74 each represent one voltage drop (instead of three) between the circuit input and the windings 47, thus supplying more of the input voltage to the windings 47. This consequently improves the power efficiency of the winding circuit 60, thereby decreasing the operating cost of the fan 10.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A fan comprising:
   a rotor and a stator, the rotor including a magnet, the stator including a first winding and a second winding, the windings interacting with the magnet to rotate the rotor, the stator also including a magnet sensor to alternatively transmit current through the first winding and through the second winding, the magnet sensor sensing the rotation of the magnet;
   a first integrated circuit electrically connected between the first winding and the sensor; and
   a second integrated circuit electrically connected between the second winding and the sensor,
   the first integrated circuit including a first transistor for powering the first winding and including a thermal shutdown element,
   the second integrated circuit including a second transistor for powering the second winding and including a thermal shutdown element.

2. The fan as defined by claim 1 wherein the first integrated circuit comprises an autoprotected MOSFET having a current regulating element.

3. The fan as defined by claim 1 wherein the first integrated circuit includes a MOSFET.

4. The fan as defined by claim 1 wherein the first and second integrated circuits each include a MOSFET.

5. The fan as defined by claim 1 wherein the magnet sensor is a Hall effect sensor.

6. The fan as defined by claim 1 wherein the magnet sensor includes a power input, the fan further including a capacitor connected to the power input for reducing noise transients.

7. A fan comprising:
   a rotor and a stator, the rotor including a magnet, the stator including a first winding and a second winding, the windings interacting with the magnet to rotate the rotor, the stator also including a magnet sensor to alternatively transmit current to the first winding and to the second winding, the magnet sensor sensing the rotation of the magnet;
   a first integrated circuit electrically connected between the first winding and the sensor; and
   a second integrated circuit electrically connected between the second winding and the sensor,
   the first integrated circuit including a first transistor for powering the first winding and including a current regulating element,
   the second integrated circuit including a second transistor for powering the second winding and including a current regulating element.

8. The fan as defined by claim 7 wherein the first integrated circuit comprises an autoprotected MOSFET having a thermal shutdown element.

9. The fan as defined by claim 7 wherein the first integrated circuit includes a MOSFET.

10. The fan as defined by claim 7 wherein the magnet sensor is a Hall effect sensor.

11. A fan comprising:
    a rotor and a stator, the rotor including a magnet, the stator including a first winding and a second winding, the windings interacting with the magnet to rotate the rotor, the stator also including a magnet sensor to alternatively transmit current to the first winding and to the second winding, the magnet sensor sensing the rotation of the magnet, the fan further including:
    a first integrated circuit electrically connected between the first winding and the sensor; and
    a second integrated circuit electrically connected between the second winding and the sensor,
    the first integrated circuit including a first transistor for powering the first winding,
    the second integrated circuit including a second transistor for powering the second winding,
    at least one of the first integrated circuit and the second integrated circuit including a thermal shutdown element.

12. The fan as defined by claim 11 wherein at least one of the first integrated circuit and the second integrated circuit include a current regulating element.

13. The fan as defined by claim 11 wherein the first integrated circuit includes a MOSFET.

14. A fan comprising:
    a rotor and a stator, the rotor including a magnet, the stator including a first winding and a second winding, the windings interacting with the magnet to rotate the rotor, the stator also including a magnet sensor to alternatively transmit current to the first winding and to the second winding, the magnet sensor sensing the rotation of the magnet, the fan further including:
    a first integrated circuit electrically connected between the first winding and the sensor; and
    a second integrated circuit electrically connected between the second winding and the sensor,
    the first integrated circuit including a first transistor for powering the first winding,
    the second integrated circuit including a second transistor for powering the second winding, at least one of the first integrated circuit and the second integrated circuit including a current regulating element.

15. The fan as defined by claim 14 wherein at least one of the first and second integrated circuits comprises an auto-protected MOSFET.

16. The fan as defined by claim 14 wherein at least one of the first integrated circuit and the second integrated circuit includes a thermal shutdown element.

17. The fan as defined by claim 14 wherein the first integrated circuit includes a MOSFET.

18. A winding circuit in a fan having a rotor and a stator, the rotor including a magnet, the stator including a first winding and a second winding, the windings interacting with the magnet to rotate the rotor, the stator also including a magnet sensor to alternatively transmit current to the first winding and to the second winding, the winding circuit further including:

a first integrated circuit connected between the first winding and the sensor; and a second integrated circuit connected between the second winding and the sensor, the first integrated circuit including a first transistor for powering the first winding, the second integrated circuit including a second transistor for powering the second winding, at least one of the first integrated circuit and the second integrated circuit including a thermal shutdown element.

19. The winding circuit as defined by claim 18 wherein at least one of the first integrated circuit and the second integrated circuit comprises an autoprotected MOSFET having a current regulating element.

20. A winding circuit for use in a fan having a rotor and a stator, the rotor including a magnet, the stator including a first winding and a second winding, the windings interacting with the magnet to rotate the rotor, the stator also including a magnet sensor to alternatively transmit current to the first winding and to the second winding, the winding circuit further including:

a first integrated circuit connected between the first winding and the sensor; and a second integrated circuit connected between the second winding and the sensor, the first integrated circuit including a first transistor for powering the first winding, the second integrated circuit including a second transistor for powering the second winding, at least one of the first integrated circuit and the second integrated circuit including a current regulating element.

21. The winding circuit as defined by claim 20 wherein the first and second integrated circuits each include a MOSFET.

22. The winding circuit as defined by claim 20 wherein the magnet sensor is a Hall effect sensor.

23. The winding circuit as defined by claim 20 wherein the magnet sensor includes a power input, the fan further including a capacitor connected to the power input for reducing noise transients.

24. The winding circuit as defined by claim 20 wherein the at least one of the first integrated circuit and the second integrated circuit includes a thermal shutdown element.

* * * * *